April 23, 1935. G. W. JANSON 1,998,763
DIRECT READING CLOCK
Filed March 12, 1931 7 Sheets-Sheet 1

FIG. 1

INVENTOR
G. W. JANSON
BY Eugene E. Brown
ATTORNEY

April 23, 1935. G. W. JANSON 1,998,763
DIRECT READING CLOCK
Filed March 12, 1931 7 Sheets-Sheet 2

INVENTOR
G. W. JANSON

BY ATTORNEY

April 23, 1935.　　　G. W. JANSON　　　1,998,763
DIRECT READING CLOCK
Filed March 12, 1931　　7 Sheets-Sheet 3

INVENTOR
G. W. JANSON
BY ATTORNEY
Eugene C. Brown

April 23, 1935.  G. W. JANSON  1,998,763
DIRECT READING CLOCK
Filed March 12, 1931   7 Sheets-Sheet 4

FIG. 6

INVENTOR
G. W. JANSON
BY ATTORNEY
Eugene G. Brown

April 23, 1935.  G. W. JANSON  1,998,763
DIRECT READING CLOCK
Filed March 12, 1931   7 Sheets-Sheet 6

Inventor
G. W. JANSON
By his Attorney
Eugene C. Brown

April 23, 1935.  G. W. JANSON  1,998,763
DIRECT READING CLOCK
Filed March 12, 1931   7 Sheets-Sheet 7

Inventor
G. W. JANSON
By his Attorney
Eugene C. Brown

Patented Apr. 23, 1935

1,998,763

UNITED STATES PATENT OFFICE 1,998,763

DIRECT-READING CLOCK

George W. Janson, Nutley, N. J., assignor to The Western Union Telegraph Company, New York, N. Y., a corporation of New York Application March 12, 1931, Serial No. 522,057

10 Claims. (Cl. 58—125)

This invention relates to a time indicating apparatus of the type in which figures representing the hours, minutes, and fractions-of-minutes are arranged upon endless carriers, operated in proper timed relation, to give a direct reading.

It has been proposed heretofore to employ time indicating devices of this nature, in which the figures are carried upon an endless belt or drum. These devices have usually required a separate source of power for each carrier, the carriers being released for movement by an escapement mechanism controlled by the carrier representing the shortest unit of time. Where a single source of power is used, the carrier representing the shortest unit of time, as the minute carrier, at the end of each longer unit of time, operates the next higher carrier, as the tens-of-minutes carrier, which in turn operates the hour carrier. This type is not well adapted, however, for large clocks since the power required for the simultaneous operation of the hour, tens-of-minutes and minute carriers, at the beginning of each hour, is considerable and must be present at all times. The excess power, when only the minute carrier is operated, has a tendency to render the clock mechanism noisy. Moreover, operation by an electric motor cannot be economically accomplished since the load on the motor is not uniform but dependent upon the number of carriers operating at any particular instant.

The present invention has for one of its objects to provide a direct reading clock employing a plurality of endless carriers driven by a single motor, in which the load on the driving motor is substantially uniform at all times.

Another object is to provide a time indicating device using a plurality of separate carriers in which the carriers may be quickly and conveniently set at the correct time while maintaining the proper relative positions of the individual operating mechanisms of the carriers.

Other objects and advantages of the invention will hereinafter appear.

In accordance with a preferred embodiment of my invention I employ a plurality of endless carriers representative of hours, tens-of-minutes, minutes and fractions-of-minutes, the carriers having suitable figures thereon and operating by predetermined movement from a continuously operating, uniform speed motor. The energy required for operating each carrier is stored in a spring or equivalent member between the intervals of movement, whereby the load on the driving motor is uniformly distributed in point of time. Release mechanism driven in proper timed relation by the motor causes the stored energy to actuate the carriers at the proper moment.

The release mechanism for the tens-of-minutes and fractions-of-minutes carriers are preferably independently controlled directly from the source of power, and the movement of the hour and minute carriers controlled from the movement of the tens-of-minutes and fractions-of-minutes carriers, respectively.

It will appear, however, from the following detailed description of a preferred embodiment of the invention that other arrangements may be employed.

In order that the invention may be more fully understood, reference will be had to the accompanying drawings in which.

Figure 1:
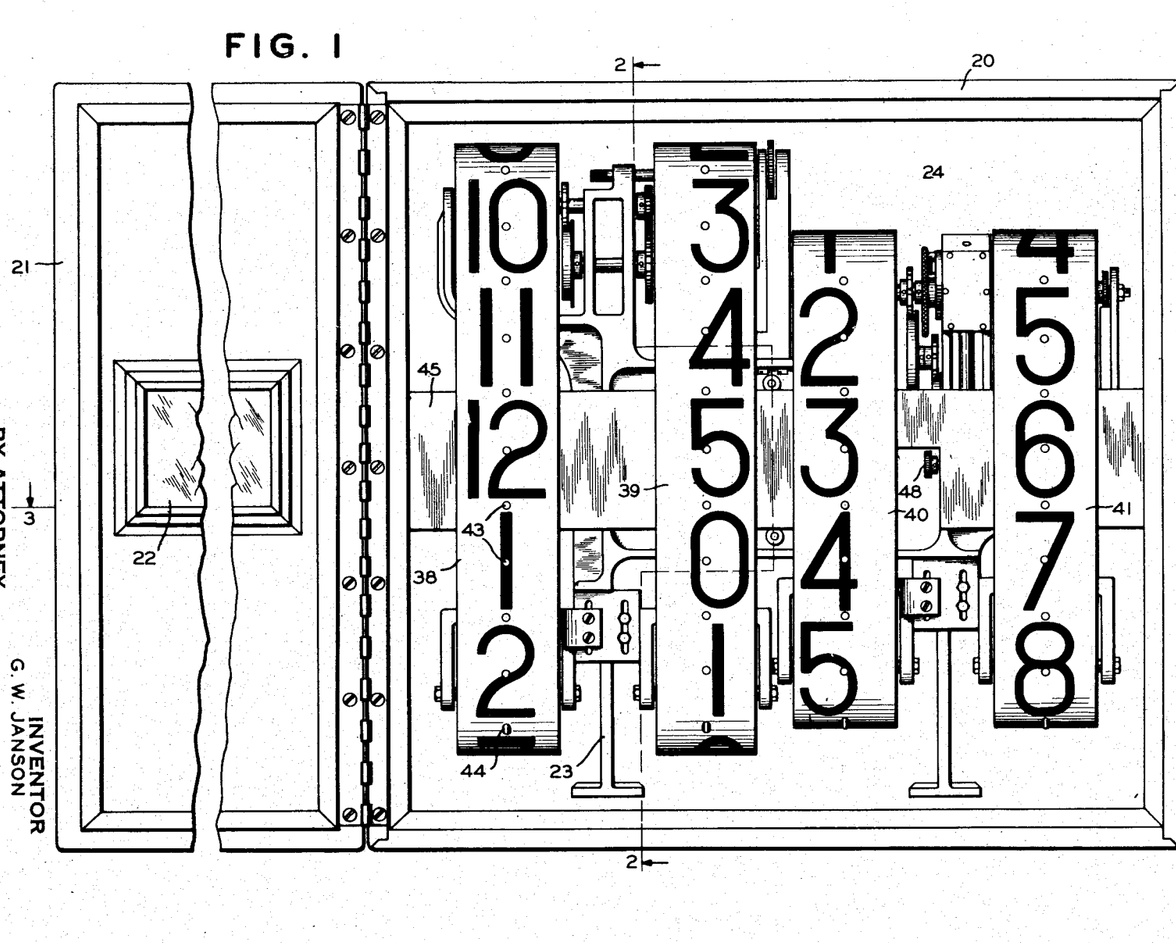
Figure 1 is a front view of the clock casing and contents, with the closure member in open position.
Figure 2:
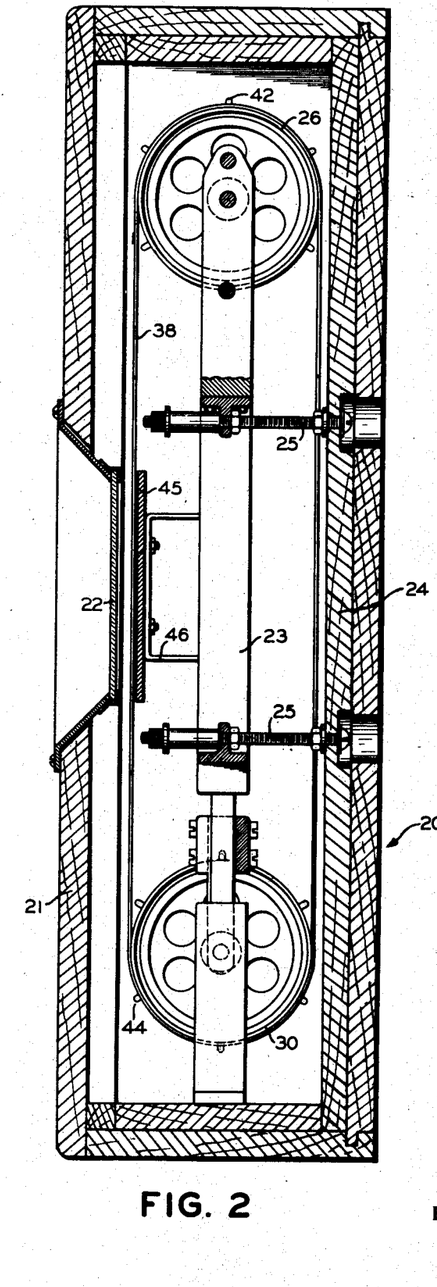
Figure 2 is a vertical sectional view on the line 2—2 of Figure 1.
Figure 3:
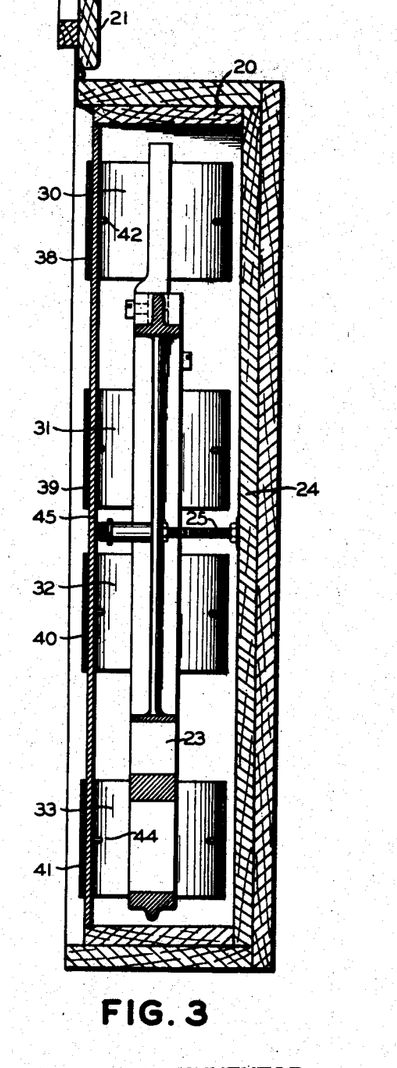
Figure 3 is a horizontal sectional view on the line 3—3 of Figure 1.

Referring first to Figure 1, the time indicating device is shown contained within a suitable casing 20 having a hinged closure member 21, illustrated in the open position and provided with a transparent central zone or window 22 through which a restricted view of the interior may be had. The time mechanism is supported upon an irregular shaped casting 23 adjustably secured to the rear wall 24 of the casing (Figure 2) by bolts 25.

Four driving drums 26, 27, 28 and 29 (Figure 4) are mounted at the upper side of the casting, and four corresponding idler drums 30, 31, 32 and 33 are mounted in forked brackets 34, having offset lugs 35 adjustably secured to the flat faces 36 at the lower side of the casting by bolts or other suitable fastening members 37. Endless belts 38, 39, 40 and 41 pass about each pair of drums and are arranged to be driven from the upper drums by pins 42 disposed around the periphery of the driving drums and engaging in perforations 43 in the belts. Corresponding pins 44 extending from the face of the idler drums also engage in the perforations in the belt. The hours belt 38 is provided with the Figures 1 to 12, the tens-of-minutes belt 39 is of the same length and is provided with two sets of characters 0 to 5. The minutes and fractions-of-minutes belts 40 and 41 respectively, are of shorter length and each carries the figures 0 to 9. The window 22 is of such width as to expose only a single horizontal row of figures therethrough, representing the time in hours, minutes and tenths-of-minutes.

An opaque shield 45 carried from the casting by a bracket 46 extends back of each of the belts transversely across the casing, adjacent the window 22 and blocks out the space between the adjacent belts.

A non-self-starting synchronous motor 47 is shown for operating the time indicating mechanism. A thumb knob 48, conveniently located between the minutes and fractions-of-minutes drums, serves for bringing the motor up to speed. The shield 45 is cut away to give access to the starting knob. The motor may operate on the regular sixty cycle alternating current power supply or it may be operated by a master clock. Any other suitable driving arrangement may be employed, as for instance, a spring motor controlled by an escapement mechanism.

The motor shaft 49 passes through a gear housing 50 formed in the casting, and has a worm 51 meshing with a gear 52 carried by an inclined shaft 53 bearing in the lower wall of gear housing 50 and the upper wall of a similar gear housing 54. A worm 55 formed on the upper end of the shaft 53 meshes with a gear 56, within the housing 54. The gear 56 is loosely mounted upon a shaft 57 and is provided with a sleeve member 58 passing through a wall of the gear housing and having a ratchet wheel 59 fixed to the outer end thereof.

A knurled wheel 60 is secured to the shaft 57, as by a pin 61 and has a pawl 62 mounted thereon and normally held in engagement with one of the teeth of the ratchet wheel 59 by a coiled spring 63, whereby the shaft 57 is continuously rotated by the electric motor 47 through the ratchet and pawl. The shaft 57 may be manually rotated in a forward direction independently of the motor, however, through the knurled wheel 60. The shaft 57 extends to the right through the wall of the gear housing 54, into the interior of the fractions-of-minutes drum 29 and to the left through the minute drum 28.

The fraction-of-minutes drum 29 is carried by a central flanged disc 64, the hub 65 of which is loosely mounted upon the end of the shaft 57. A spring housing 66 is fastened to the web of the disc 64, by means of screw 67 and a housing in the form of a flanged disc 68 is secured to the spring housing, as by screws 69.

The end of the shaft 57 within the spring housing 66 is slotted at 70 and the inner end of a spiral spring 71 is anchored therein, the outer end of the spring being secured to a pin 72 mounted in the wall of the housing.

An eccentric 73, keyed at 74 to the shaft 57, is disposed within the flanged disc 68. A collar 75, surrounding the eccentric, has a radial extension 76 projecting through a recess 77, in the flange of the disc 68, the outwardly projecting end having a lateral extension or stop arm 78, overlying the periphery of a circular plate 79 having three equally spaced shoulders 80. The plate 79 is secured to the gear housing 54 by screws 81.

The stop arm 78 is normally retracted by the eccentric 73 and held against one of the stop shoulders 80, thus retaining the flanged disc 68 against rotation, by engagement of the radial extension 76 with the flange of the disc. Since the drum 29 is rigidly secured to the disc 68, it is also held stationary. As the shaft 57 continues to rotate, tension is applied to the spring 71 and at the end of each third of a revolution of the shaft, the eccentric 73 moves the stop arm outwardly beyond the shoulder 80, releasing the same and permitting it to be rotated a third of a revolution about the eccentric, by the spring 71, whereupon it is retracted by the eccentric so as to engage the succeeding shoulder 80. Drum 29 moves with the arm 76 and accordingly is advanced one-third of a revolution. Each step of the drum 29 of one-third of a revolution advances a new figure into view.

For convenience the fraction-of-minutes belt is divided into tenths-of-minutes, thereby requiring the drum 29 to be operated in six second intervals. The load on the motor, however, is uniform throughout the entire period, the shaft 57 being geared to rotate continuously at the rate of 3⅓ revolutions per minute.

Figure 4:
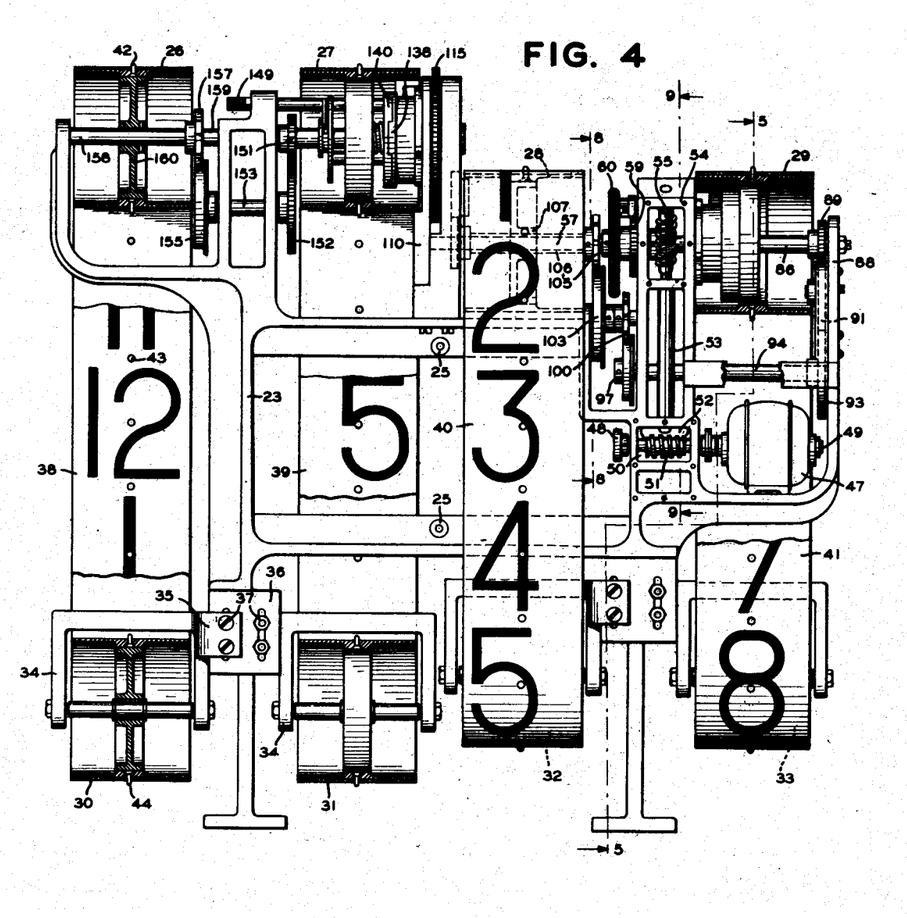
Figure 4 is a front elevation, partly in section, of the time indicating mechanism.
Figure 5:
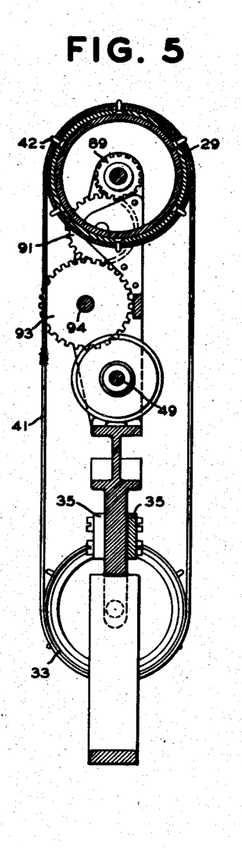
Figure 5 is a vertical sectional view of the fractions-of-minutes carrier taken on the line 5—5 of Figure 4.
Figure 6:
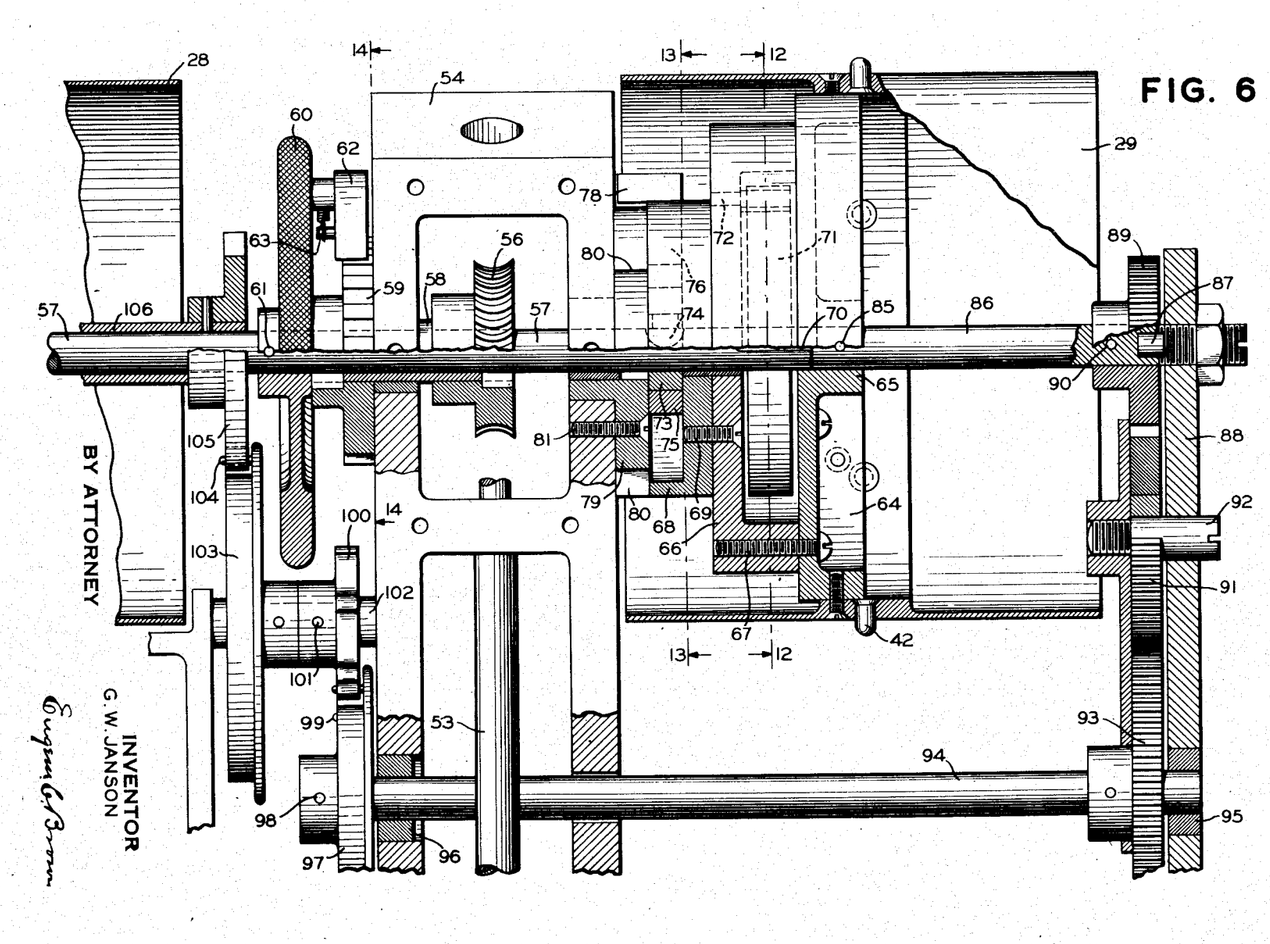
Figure 6 is an enlarged front elevation partly in section of the fractions-of-minutes drum with the belt removed and the operating mechanism therefor.

The minute drum 28 is actuated by a similar spiral spring 84 (Figure 7), tensioned at a uniform rate by the shaft 57, as will more fully appear hereinafter. The minute drum is released for movement under the driving force of the spring 84, at the proper intervals, in accordance with the movement of the fraction-of-minutes drum 29. For this purpose the hub 65 is fixed by a pin 85, to a shaft 86, aligned with the shaft 57 and bearing upon a pin 87 threaded in the side plate 88 of the main casting. A gear 89 pinned at 90 to the shaft 86, meshes with a gear 91 carried on a stub shaft 92, which in turn engages with a gear 93 fixed on the shaft 94, extending parallel to the shaft 57 and journaled in bearings 95 and 96 in the casting. A driving wheel 97, of a geneva, is pinned at 98 to the opposite end of the shaft 94 and is provided with three driving pins 99 (see Figure 8), engaging the six-armed Maltese cross member 100. The cross member is secured by pin 101 to a shaft 102 to which is also secured the driving wheel 103, of a second geneva. The disc 103 has two driving pins 104 disposed adjacent to each other and arranged to engage the slots of the cross member 105. This latter member is fixed to a sleeve 106, loosely mounted upon the shaft 57 and to which the drum 28 is rigidly secured through the central web 107 (Figure 4).

The shaft 94 is geared to rotate at two revolutions per minute, thus advancing the Geneva driving wheel 103 at the rate of one revolution per minute, in an intermittent manner. The Maltese cross member 105 is normally locked against movement by the cylindrical face of the locking disc 108 which is integral with and a part of the driving wheel 103 and the relative position of the driving pins 99 and 104 is such that the latter pins are moved successively into slots of the driven cross member 105 during the last step of the drum 29, at the end of the minute interval, thereby releasing the drum 28 for movement, primarily under the tension of the spring 84 to advance a new figure on the minutes belt into position behind the window 22.

Figure 7:
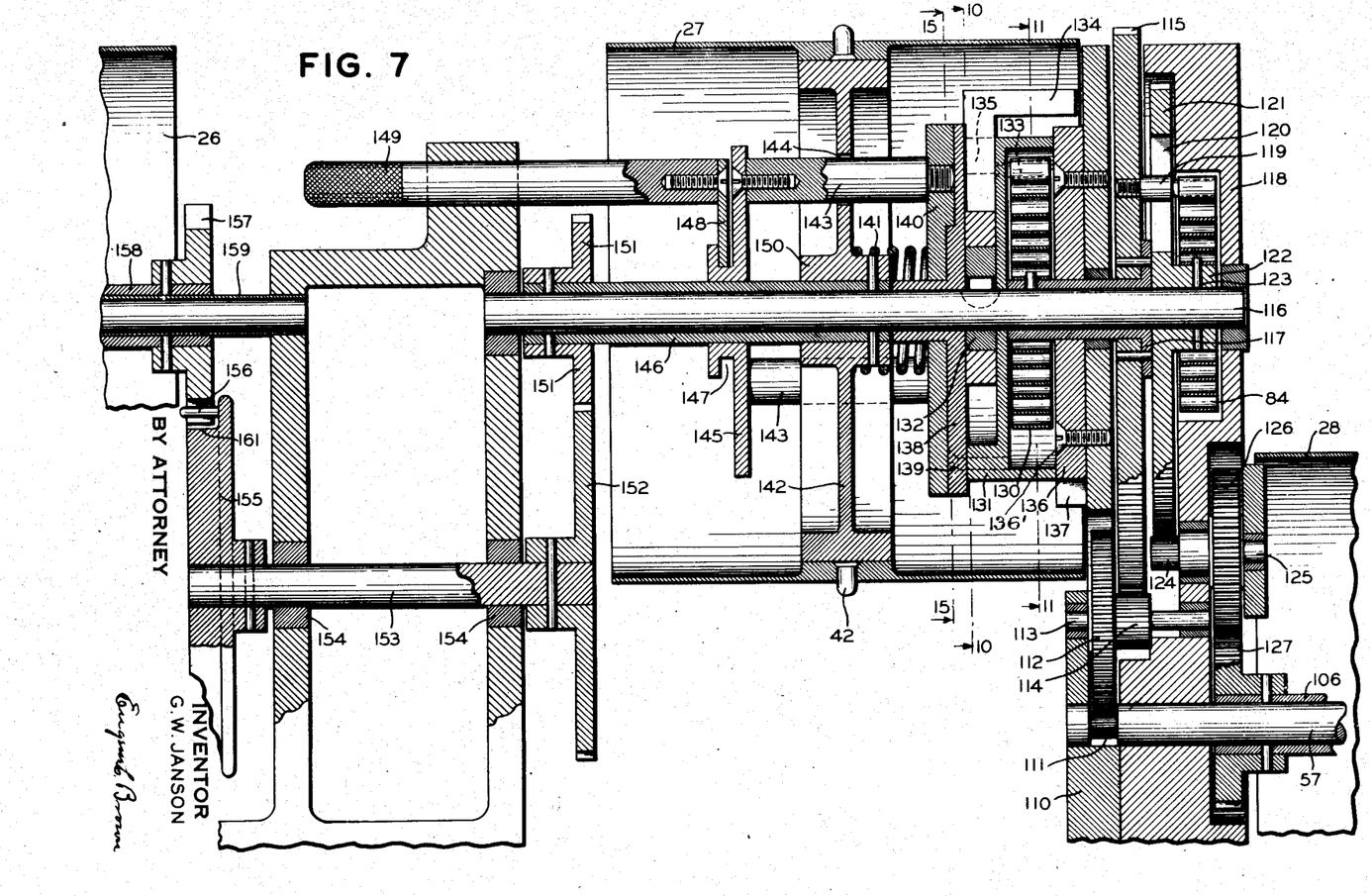
Figure 7 is a similar view of the tens-of-minutes drum, with the belt removed, and showing the operating mechanism for the minute, tens-of-minutes and hour drums.
Figure 8:
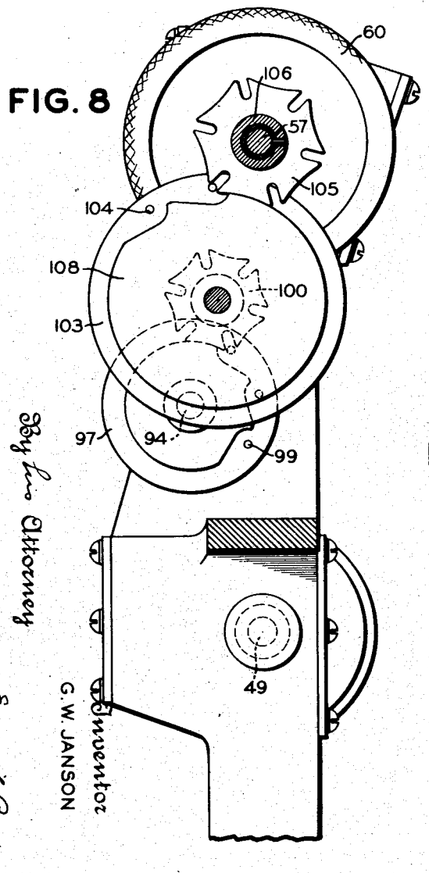
Figure 8 is a sectional view on the line 8—8 of Figure 4, showing the means for releasing the minutes drum for movement.
Figure 9:
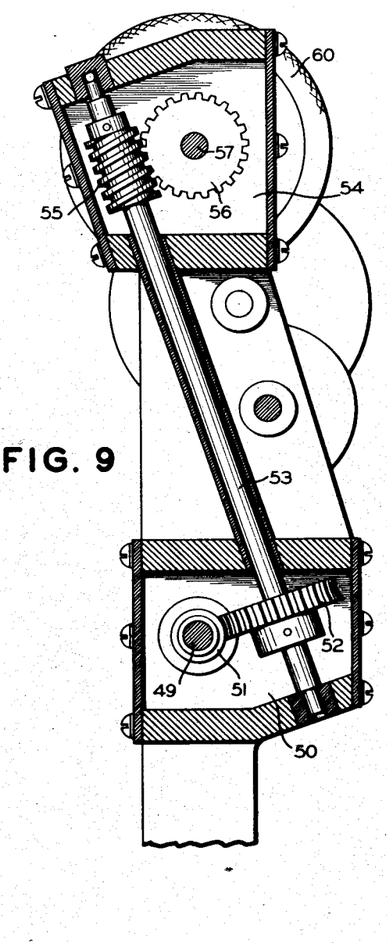
Figure 9 is a sectional view on the line 9—9 of Figure 4.
Figure 10:
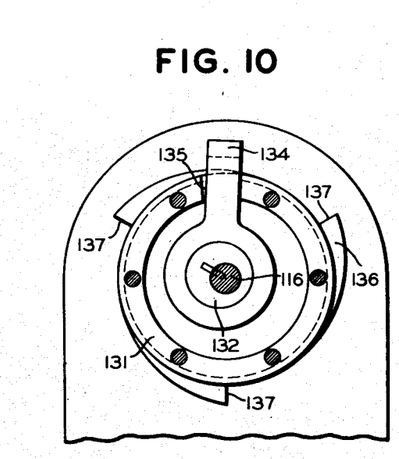
Figure 10 is a sectional view on the line 10—10 of Figure 7, showing the release mechanism for the tens-of-minutes carrier.
Figure 11:
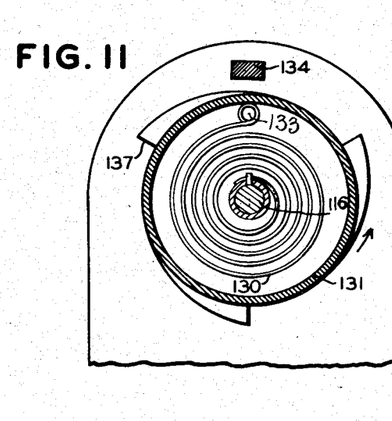
Figure 11 is a sectional view on the line 11—11 of Figure 7, showing the power storage device for the tens-of-minutes carrier.
Figure 12:
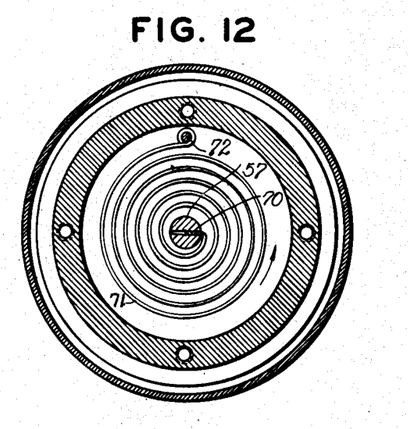
Figure 12 is a sectional view on the line 12—12 of Figure 6, showing the power storage device for the fractions-of-minutes drum.
Figure 13:
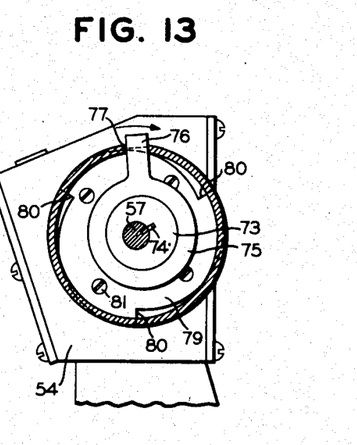
Figure 13 is a sectional view on the line 13—13 of Figure 6, illustrating the release mechanism for the fractions-of-minutes drum.
Figure 14:
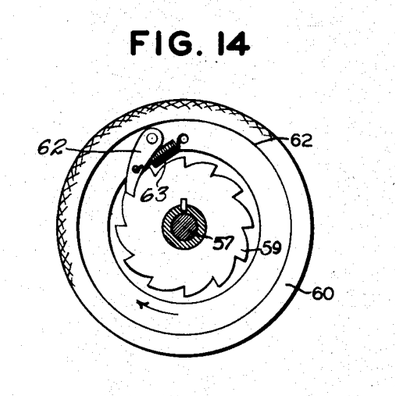
Figure 14 is a sectional view on the line 14—14 of Figure 6.
Figure 15:
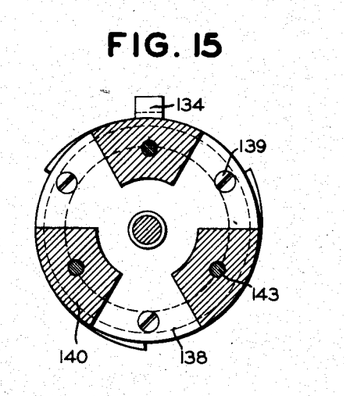
Figure 15 is a sectional view on the line 15—15 of Figure 7.

Referring to Figure 7 it will be seen that the left end of the shaft 57 is journaled in a plate 110 mounted upon the main casting. A series of gear teeth 111 are formed adjacent the end of the shaft 57 and mesh with a gear 112, secured to the short shaft 113, to which is also secured a pinion 114, meshing with a large gear 115, fixed to a drum operating shaft 116, through the sleeve 117. The spring 84 is contained within a housing formed by the plate 118, and the outer end of the spring is anchored to a pin 119 carried by the gear 115. The pin 119 passes through an opening 120 in a gear 121 loosely mounted on the shaft 116 and the inner end of the spring is secured to the hub 122 of the gear 121, by a pin 123. Gear 121 meshes with a pinion 124 carried by a shaft 125, and a second gear 126 on the shaft 125 engages with a gear 127 fixed to the sleeve 106, to which the drum 28 is secured.

The gear train, including gears 121, 124, 126 and 127, is normally locked against movement by the Geneva locking disk 108 and the gear 115 is continuously rotated at a reduced rate, from the shaft 57, thus applying tension to the spring 84 during the idle intervals of the drum 28. The load on the motor for operating this drum, is therefore uniformly distributed in point of time. At the end of each minute interval when the drum 28 is unlocked through the geneva, the spring 84, acting through the gears 121, 124, 126 and 127, rotates the drum 28 one-third of a revolution, corresponding to two of the slots of the Geneva cross 105.

The shaft 116 is geared to rotate one-third of a revolution for each ten minute period, and serves to drive the tens-of-minutes drum 27 through a spiral or storage spring 130 contained within a housing formed in one side of a flange disk 131, the other side of which houses an eccentric 132 keyed to the shaft 116. The inner end of the spring 130 is pinned to the sleeve 117, which rotates with the shaft 116, and the outer end of the spring is secured to a pin 133 mounted in the web of the disk 131. A stop arm 134, reciprocated by the eccentric, extends outwardly through a recess 135 in the left flange of the disk 131 and lies over the periphery of the circular plate 136 having three stop shoulders 137. The plate 136 is secured to plate 110 by suitable screws 136'. The driving member 138 of an interlocking clutch is secured to the spring housing 131 by means of screws 139 and the driven clutch member 140 is normally held in engagement with the driving member by a compression spring 141 disposed between the member 140 and the central disk 142 of the drum 27. The drum 27 is driven from the member 140 by series of three pins 143, extending through apertures 144 in the disk. A plate 145, loosely mounted upon a sleeve 146, is secured to the outer ends of the pins 143 and has an annular recess 147 into which a yoke 148 extends and which serves, through the knurled rod 149, to enable the clutch members 138 and 140 to be disengaged, for the purpose of setting the hour and tens-of-minutes drums, as will appear more fully hereinafter.

The tens-of-minutes drum 27 is normally held against rotation by the stop arm 134, engaging one of the shoulders 137, during which time the energy for subsequently rotating the drum 27, is being stored in the spring 130. At the end of each third of a revolution of the shaft 116, the stop arm 134 is released, permitting the drum to be advanced by the spring 130 to move a new figure into the tens-of-minutes position.

The hour drum 26 is operated and timed by the movement of the tens-of-minutes drum 27. For this purpose the hub 150 of the drum 27 is secured to the sleeve 146, which in turn carries a gear 151, meshing with a gear 152, mounted on a shaft 153 journaled in the bearings 154, in the main casting. The driving wheel 155, of a geneva, is secured to the opposite end of the shaft 153 and is provided with two driving pins 156 arranged to engage in the slots of a six-armed Maltese cross member 157, secured to a sleeve 158, loosely mounted upon a tubular shaft 159. The sleeve 158 is secured to the hub member 160 (Figure 4) of the hours drum 26. The construction of the Geneva wheels 155 and 157 is the same as that of wheels 103 and 105, and the arrangement of the pins 156, relative to the cross member, is such that the two pins are brought successively into engagement with succeeding slots of the cross during the last step of the tens-of-minutes drum 27, at the beginning of each hour. The gear ratio is such that the wheel 155 makes a sixth of a revolution upon each movement of the drum 27, and at the beginning of each hour rotates the star wheel a third of a revolution, advancing a new figure into the hours position. During the remainder of the time the Geneva cross 157 is locked against movement by the locking rim 161.

It will be noted that the spring 130 serves to actuate both the tens-of-minutes drum and the hours drum. This requires that the tension of the spring be greater than that required to operate the tens-of-minutes drum alone. However, this drum is operated at intervals of ten minutes only and for the particular purpose for which the present embodiment was designed, the slight noise incident to such operation is not found objectionable.

If for any reason it is necessary to reset the clock, this may be conveniently accomplished by rotating the knurled wheel 60 to advance the entire clock mechanism at a rate greater than the normal rate of operation of the clock provided by the motor 47. However, if it is necessary to advance the hour and tens-of-minutes belts, this may be done more conveniently by disengaging the clutch members 138 and 140 by means of the knurled rod 149 and manually advancing the tens-of-minutes belt, and if sufficient movement is applied thereto, thereby advancing the hours belt, into proper position. The clutch members 138 and 140 are provided with three interlocking segments corresponding to each third of a revolution of the drum 27, thus insuring that the proper relation is maintained between the belt 39 and the operating mechanism for the tens-of-minutes drum.

It is evident, of course, that variations in the details of construction may be devised without departing from the invention, and I do not desire to be limited to the exact details shown and described but contemplate all modifications and variations in the mechanism included within the terms of the appended claims.

What I claim is:

1. In a time indicating device a figure carrier representing a definite interval of time, a motor, a drive shaft continuously operated by said motor, spring means for driving said carrier, means for continuously applying power from said drive shaft to said spring means at a uniform rate to stress the same, means normally restraining said carrier against movement and an eccentric operated by said drive shaft in a plurality of angular positions thereof for releasing said carrier for advancement intermittently by said spring at the end of each interval of time represented thereby.

2. In a time indicating device a plurality of figure carriers representing different intervals of time, a motor, individual springs for driving said carriers, means for continuously applying power from said motor to each of said springs at a uniform rate to stress the same, means normally restraining the carriers against movement, and timing means for intermittently releasing for movement by its spring, a carrier corresponding to one interval of time and means controlled by predetermined movement of said latter carrier for releasing for movement by its spring, a carrier corresponding to a longer interval of time.

3. In a time indicating device a plurality of figure carriers representing different intervals of time, a motor, individual springs for driving said carriers, means for continuously applying power from said motor to each of said springs at a uniform rate, to stress the same, means normally restraining the carriers against movement, an eccentric operated by said motor for intermittently releasing for movement, by its spring, the carrier corresponding to one interval of time, and an intermittent movement controlled by predetermined movement of said latter carrier for releasing for movement, by its spring, a carrier corresponding to a longer interval of time.

4. A time indicating device comprising a source of power, a figure carrier representing a predetermined time interval, a second figure carrier representing a longer time interval, common driving means for said figure carriers, a detachable connection between said second carrier and driving means, whereby the second carrier may be operated by said driving means or moved independently thereof, and a variable connection between said source of power and said driving means, whereby all of said carriers may be moved independently of said source of power.

5. A time indicating device comprising a source of power, a group of figure carriers representing predetermined time intervals, a second group of figure carriers repesenting longer time intervals, driving means for said figure carriers, a clutch mechanism operatively connecting said second group of carriers with said driving means, whereby the second group of carriers may be operated by the driving means or released for independent movement, and a pawl and ratchet connection between said source of power and driving means, whereby both of said groups of carriers may be moved independently of said source of power.

6. Intermittent driving mechanism for a time indicating device comprising a shaft rotatable at a uniform speed, a driven member, resilient means connecting said shaft and driven member, means normally holding said driven member stationary, an eccentric driven by said shaft and acting in a plurality of pre-determined angular positions of said shaft, to release said driven member and permit it to move a pre-determined distance under the force of said resilient means.

7. Intermittent driving mechanism for a time indicating device comprising a shaft rotatable at a uniform speed, a figure carrier, means normally holding the carrier stationary, means for absorbing power from said shaft while said carrier is stationary, means acting in pre-determined angular positions of said shaft for releasing the carrier for pre-determined movement by the power absorbing means, a second carrier, means normally holding said second carrier stationary, separate means for absorbing power from said shaft to actuate said second carrier and means controlled by the movement of said first carrier for releasing said second carrier for movement.

8. Intermittent driving mechanism for a time indicating device comprising a shaft rotatable at a uniform speed, a figure carrier, means tending to rotate said carrier, means normally holding the carrier stationary, means acting in pre-determined angular positions of said shaft for releasing the carrier for pre-determined movement, a second carrier, means normally holding said second carrier stationary, means for absorbing power at a uniform rate from said shaft to actuate said second carrier and means controlled by the movement of said first carrier for releasing said second carrier for movement by said power absorbing means.

9. A time indicating device comprising individual figure carriers representing hours, tens-of-minutes, minutes and fractions-of-minutes, means normally holding said carriers stationary, driving means for said carriers, timing means actuated by said driving means for releasing said tens-of-minutes and fractions-of-minutes carriers at pre-determined intervals for movement by said driving means and means actuated by pre-determined movement of said tens-of-minutes and fractions-of-minutes carriers, respectively, for releasing said hours and minutes carriers, for movement by said driving means.

10. A time indicating device comprising a plurality of endless belts carrying figures representing different units of time, a driving drum for each of said belts, an idler drum, a separate driving spring for intermittently actuating each of said driving drums, a common source of electric motive power, means for applying said power at a uniform rate to said driving springs, timing means for intermittently releasing a drum representative of a short time interval and means controlled by movement of said last drum for releasing a drum representative of a longer time interval.

GEORGE W. JANSON.